(12) United States Patent
Thoen et al.

(10) Patent No.: US 10,348,370 B2
(45) Date of Patent: Jul. 9, 2019

(54) WIRELESS DEVICE COMMUNICATION

(71) Applicant: NXP B.V., Eindhoven (NL)

(72) Inventors: Steven Mark Thoen, Leuven (BE);
Pieter Verschueren, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/667,352

(22) Filed: Aug. 2, 2017

(65) Prior Publication Data
US 2019/0044576 A1  Feb. 7, 2019

(51) Int. Cl.
| | |
|---|---|
| *H04W 4/80* | (2018.01) |
| *H04B 7/026* | (2017.01) |
| *H04W 88/18* | (2009.01) |
| *H04W 84/22* | (2009.01) |
| *H04W 56/00* | (2009.01) |
| *H04W 76/14* | (2018.01) |
| *H04B 5/00* | (2006.01) |
| *H04M 1/60* | (2006.01) |

(Continued)

(52) U.S. Cl.
CPC .......... *H04B 7/026* (2013.01); *H04B 5/0031* (2013.01); *H04M 1/6066* (2013.01); *H04W 4/80* (2018.02); *H04W 56/0015* (2013.01); *H04W 76/14* (2018.02); *H04W 84/22* (2013.01); *H04W 88/182* (2013.01); *H04B 5/0006* (2013.01); *H04B 7/0608* (2013.01); *H04M 2250/02* (2013.01); *H04W 24/08* (2013.01); *H04W 84/18* (2013.01); *H04W 92/16* (2013.01)

(58) Field of Classification Search
CPC ......... H04W 4/008; H04L 1/245; H04B 1/385
See application file for complete search history.

(56) References Cited

U.S. PATENT DOCUMENTS

| | | |
|---|---|---|
| 7,627,289 B2 | 12/2009 | Huddart |
| 8,768,252 B2 | 7/2014 | Watson et al. |

(Continued)

FOREIGN PATENT DOCUMENTS

| | | |
|---|---|---|
| CN | 2013135874 U | 8/2013 |
| CN | 106535081 A | 3/2017 |

(Continued)

OTHER PUBLICATIONS

Final Office Action; U.S. Appl. No. 15/185,929; 17 pages (dated Nov. 24, 2017).

(Continued)

*Primary Examiner* — Lakeram Jangbahadur (57) ABSTRACT

One example discloses an apparatus for wireless communication, including: a first wireless device configured to communicate with a second wireless device over a first wireless link, according to a first wireless link protocol; wherein the first wireless link protocol defines communications between the first wireless device and the second wireless device; wherein the first wireless device is configured to monitor communications on a second wireless link between the second wireless device and a third wireless device; wherein the second wireless link is configured according to a second wireless link protocol that defines communications between the second wireless device and the third wireless device; and wherein the first wireless device is configured to spoof the second wireless device in response to an error condition or signal degradation on the second wireless link.

17 Claims, 10 Drawing Sheets

(51) Int. Cl.
*H04B 7/06* (2006.01)
*H04W 92/16* (2009.01)
*H04W 24/08* (2009.01)
*H04W 84/18* (2009.01)

(56) References Cited

U.S. PATENT DOCUMENTS

| | | | |
|---|---|---|---|
| 9,742,471 B1 | 8/2017 | Thoen | |
| 2003/0100274 A1* | 5/2003 | Brown | H04M 1/6066 455/90.1 |
| 2007/0076489 A1 | 4/2007 | Lin et al. | |
| 2007/0149261 A1 | 5/2007 | Huddart | |
| 2007/0223725 A1 | 9/2007 | Neumann et al. | |
| 2008/0076489 A1 | 3/2008 | Rosner et al. | |
| 2009/0154739 A1* | 6/2009 | Zellner | H04R 1/1041 381/311 |
| 2012/0058727 A1* | 3/2012 | Cook | H04R 5/02 455/41.3 |
| 2014/0013090 A1 | 1/2014 | Zalmanovici | |
| 2014/0219467 A1 | 8/2014 | Kurtz | |
| 2014/0376735 A1 | 12/2014 | Asrani et al. | |
| 2017/0111834 A1* | 4/2017 | Belverato | H04B 5/0006 |
| 2017/0171046 A1* | 6/2017 | Flood | H04B 1/385 |
| 2018/0176717 A1 | 6/2018 | Fu et al. | |

FOREIGN PATENT DOCUMENTS

| | | |
|---|---|---|
| EP | 3258705 A1 | 12/2017 |
| WO | WO-2008/113053 A1 | 9/2008 |
| WO | WO-2014/124100 A1 | 8/2014 |

OTHER PUBLICATIONS

Bragi Company; "Bragi"; 4 pgs; retrieved from the internet Aug. 2, 2017 at://www.bragi.com/.

Hunn, M. "The Market for Smart Wearable Technology—A Consumer Centric Approach", WiForce Wirless Consulting, 63 pgs, retrieved from the internet at: http://www.nickhunn.com/wp-content/uploads/downloads/2015/07/The-Market-for-Smart-Wearables-Feb-2015-3rd-Edition-rev2.pdf (Feb. 2015).

U.S. Appl. No. 15/185,929, filed Jun. 17, 2016 42 pages.

Non Final Office Action; U.S. Appl. No. 15/185,929; 17 pages (dated Aug. 11, 2017).

NXP; "NXH2280UK: NFMI Radio for Wireless Audio and Data Streaming"; retrieved from the internet http://www.nxp.com/products/interface-and-connectivity/wireless-connectivity/nfmi-radio-solutions/nfmi-radio-for-wireless-audio-and-data-streaming:NXH2280UK; 2 pages (Jun. 17, 2016).

Non Final Office Action; U.S. Appl. No. 15/185,929; 17 pages (Feb. 22, 2018).

Notice of Allowance, U.S. Appl. No. 15/185,929; 11 pages (dated Apr. 30, 2018).

Bragi; "Wireless Smart Earphones"; retrieved from the Internet http://www.bragi.com/; 16 pages (Jun. 17, 2016).

\* cited by examiner

WIRELESS DEVICE COMMUNICATION

The present specification relates to systems, methods, apparatuses, devices, articles of manufacture and instructions for wireless device communication.

SUMMARY

According to an example embodiment, an apparatus for wireless communication, comprising: a first wireless device configured to communicate with a second wireless device over a first wireless link, according to a first wireless link protocol; wherein the first wireless link protocol defines communications between the first wireless device and the second wireless device; wherein the first wireless device is configured to monitor communications on a second wireless link between the second wireless device and a third wireless device; wherein the second wireless link is configured according to a second wireless link protocol that defines communications between the second wireless device and the third wireless device; and wherein the first wireless device is configured to spoof the second wireless device in response to an error condition or signal degradation on the second wireless link.

In another example embodiment, the first wireless device communicates with the third wireless device using the second wireless link protocol.

In another example embodiment, the third wireless device is configured not to respond to the error condition or signal degradation on the second wireless link.

In another example embodiment, the third wireless device is configured not to detect the error condition or signal degradation on the second wireless link.

In another example embodiment, the second wireless link protocol limits communications to only between the second wireless device and the third wireless device.

In another example embodiment, the second wireless device is configured to stop communicating with the third wireless device using the second wireless link protocol in response to the first wireless device communicating with the third wireless device using the second wireless link protocol.

In another example embodiment, the first wireless device is configured to send a message over the first wireless link to the second wireless device in response to the error condition or signal degradation.

In another example embodiment, the message indicates that the first wireless device is communicating with the third wireless device using the second wireless link protocol.

In another example embodiment, the wireless link protocols are based on at least one of: an NFMI protocol, an NFEMI protocol, a Wifi protocol, a Classic Bluetooth protocol, or a BLE protocol.

In another example embodiment, the first wireless device transmits an acknowledgement or a microphone signal to the third wireless device over the second wireless link in response to the error condition or signal degradation.

In another example embodiment, the first wireless device is configured to negotiate with the second wireless devices to determine which of the first and second wireless devices transmits an acknowledgement or a microphone signal to the third wireless device over the second wireless link in response to the error condition or signal degradation.

In another example embodiment, the first wireless device is configured to send the acknowledgement or microphone signal if the first wireless device receives a stronger signal strength from the third wireless device than a signal strength received by the second wireless device from the third wireless device.

In another example embodiment, the first wireless device is configured to always forward data packets received from the third wireless device to the second wireless device.

In another example embodiment, the first wireless device is configured not to forward data packets received from the third wireless device to the second wireless device unless requested to do so by the second wireless device.

In another example embodiment, the error condition is at least one of: an error caused by body shadowing; a missed data packet; a degraded data packet; digital or analog wireless communication errors; a corrupted data packet error; an incomplete data packet error; or an erratic data packet error.

In another example embodiment, the signal degradation is defined as at least one of: a signal strength below a threshold value, a signal-to-noise ratio below a threshold value, or a wanted-to-interferer ratio below a threshold value.

In another example embodiment, the first wireless device is configured to receive data packets over the second wireless link; and the data packets include at least one of: media data; video playback data; phone call data; mono audio; microphone data; stereo audio playback data; sensor data; health status data; battery status; or device settings.

In another example embodiment, the wireless devices include at least one of: a microphone; a earbud; a hearable; a smartphone; a smartwatch; a wearable device; a tablet; or a computer.

In another example embodiment, the first wireless device is a first earbud, the second wireless device is a second earbud, and the third wireless device is a smartphone.

In another example embodiment, the first wireless link is an NFMI or NFEMI link, and the second wireless link is a Bluetooth Classic link.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless devices, such as wireless earbuds (also known as Hearables), in various embodiments include embedded voice, sound and sensor capabilities. Such wireless devices can be designed to support playback of stereo sound from an external device such as a cellphone, making phone calls, responding to voice commands, detecting sound events, and so on.

Some example embodiments communicate with a smartphone or other devices, such as tablet, computers, etc., through Bluetooth Classic (BT) or through Bluetooth Low Energy (BLE), and communicate with each other using Near-Field Magnetic Induction (NFMI) or Near-Field Electro-Magnetic Induction (NFEMI) signals that can pass through various structures, including the human body, and in the case of hearables, through the human head.

While the examples discussed below tend to focus on example embodiments which transmit and receive audio data, the teachings herein also apply to media data, video data, sensor data, medical data, battery status, device settings and other data.

Figure 1:
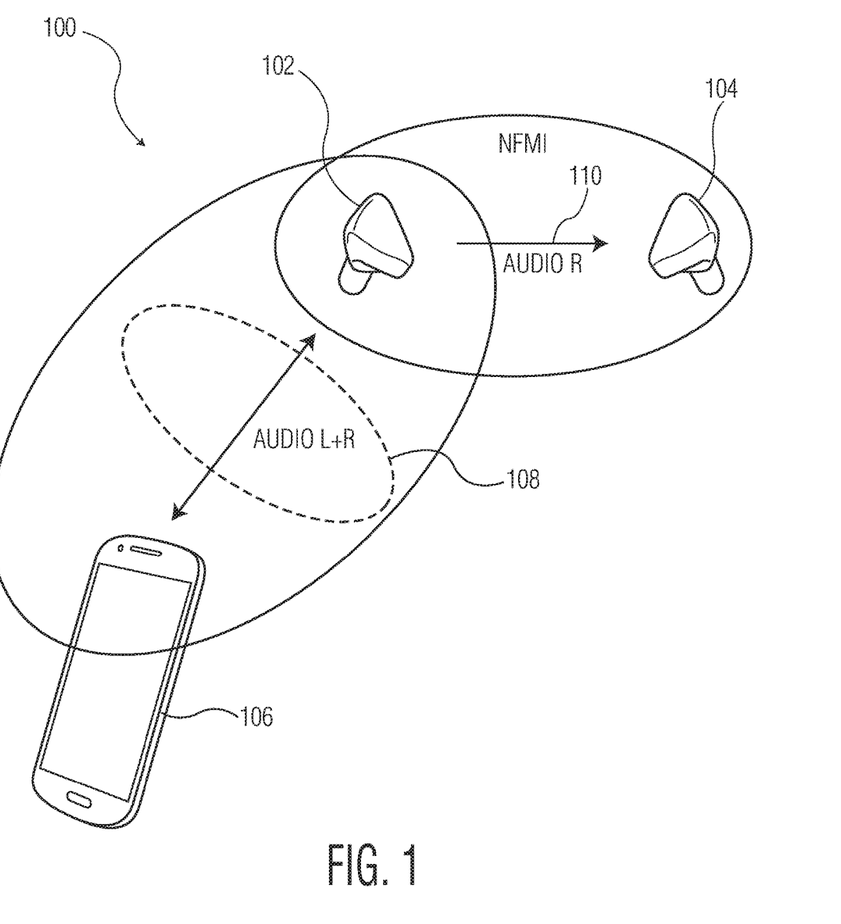
FIG. 1 pictorially depicts a first example protocol for wireless communication between wireless devices used for media playback communication.

FIG. 1 pictorially depicts a first example protocol 100 for wireless communication between wireless devices used for media playback communication. Shown in the first example 100 is a first wireless device 102 (e.g. left earbud), a second wireless device 104 (e.g. right earbud), a third wireless device 106 (e.g. smartphone), a first wireless link 108 (e.g. left and right audio signal and acknowledge signals), and a second wireless link 110 (e.g. right only audio signal).

This first protocol 100 shows example exchanges left (L) and right (R) audio channels for media (e.g. audio, video, etc.) playback.

In this single-sided NFMI apparatus, the first wireless device 102 (a.k.a. the master earbud) includes a data connection either through: a cloud network, a smartphone, or another device. The first wireless device 102 effects audio playback and communication using one or more input transducers (e.g. local microphones) and one or more output transducers (e.g. speakers).

In this first example 100, data (e.g. audio) is streamed to the wireless devices 102, 104 (e.g. earbuds) over the first wireless link 108, perhaps using an A2DP profile. The data includes a complete (e.g. L and R stereo audio) signal which is sent to just one of the wireless devices 102 (i.e. the L earbud). Thus using Bluetooth Classic there is just a single audio source and a single audio sink.

In this example, Near-Field Magnetic Induction (NFMI) is used set up the second wireless link 110 which forwards a relevant portion of the audio signal (e.g. just the R audio track) to the other wireless device 104 (e.g. R earbud). If a user is wearing the earbuds 102, 104, then the NFMI signal travels through and/or around the user's body thereby creating a full stereo audio experience at the earbuds 102, 104.

These wireless devices (e.g. smartphones, hearable earbuds, etc.) using the Bluetooth classic for the first wireless link 108 can only communicate with one other wireless device at a time. In some situations, +BT link is degraded or blocked in some way such that an acceptable BT link cannot be maintained.

For example, body shadowing can occur when the smartphone is worn in the right back pocket of a user's pants when trying to reach the left earbud. The body shadowing effect can be especially noticeable in outdoor situations where reflections and multipath propagation that might bolster the single link are absent. In this case, both earbuds will be unable to play any music.

Figure 2:
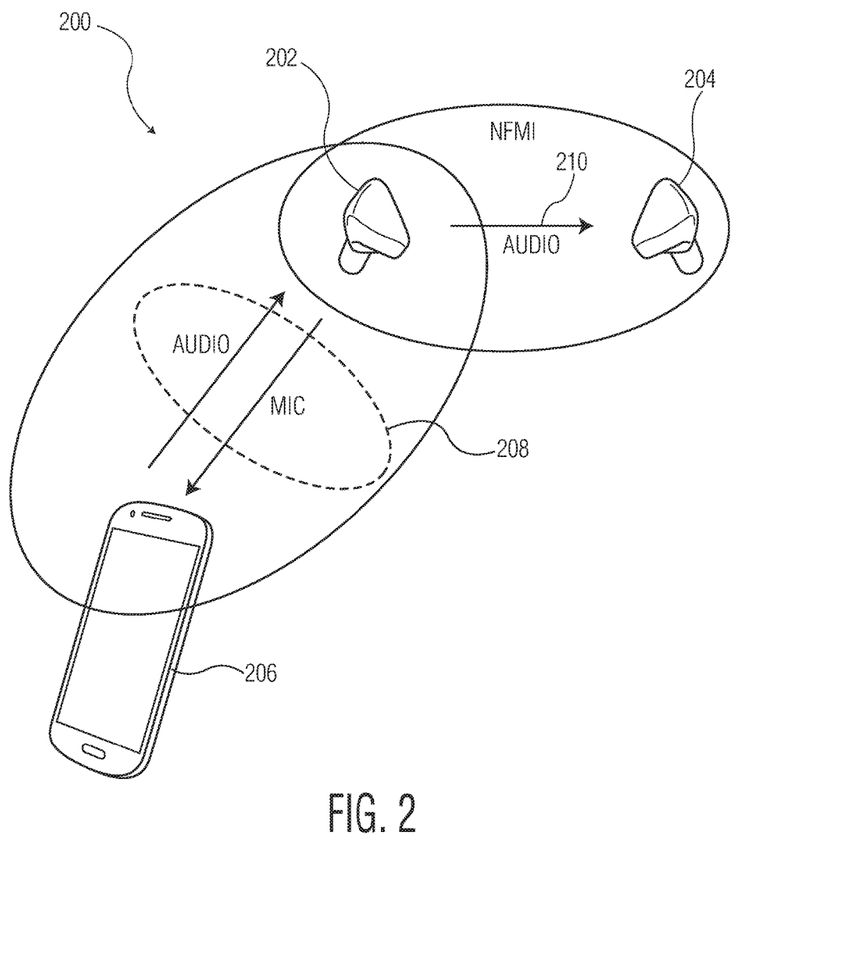
FIG. 2 pictorially depicts a second example protocol for wireless communication between wireless devices used for phone call communication.

FIG. 2 pictorially depicts a second example protocol 200 for wireless communication between wireless devices used for phone call communication. Shown in the second example 200 is a first wireless device 202 (e.g. left earbud), a second wireless device 204 (e.g. right earbud), a third wireless device 206 (e.g. smartphone), a first wireless link 208 (e.g. audio and microphone signals), and a second wireless link 210 (e.g. right only audio signal).

The first wireless link 208 shows example audio and microphone channels for effecting a phone call.

In this first example 200, data (e.g. audio and microphone signals) is streamed between the wireless devices 202, 204 (e.g. earbuds) over the first wireless link 208, perhaps using a HFP profile. However, similar to FIG. 1, using a Bluetooth Classic for the first wireless link 208 permits just a single audio source and a single microphone sink making the second example protocol 200 again susceptible to body shadowing effects.

Now discussed are example embodiments for minimizing or eliminating body shadowing and other signal degradation effects in devices communicating with wireless links that permit only a single communication source and a single communication sink.

By adding a wired or wireless connection (e.g. Near-Field Magnetic Induction (NFMI), NFEMI, WiFi, Bluetooth, etc.) as a means of having both earbuds communicate reliably with each other, an overall robustness of the wireless communication between the cellphone and the earbuds can be improved substantially.

Robustness is herein defined to include various protocols for providing an alternate data stream, including network reconfiguration, network switching, signal retransmission and/or signal diversity (e.g. use of multiple routes to transmit the same data simultaneously).

Figure 3:
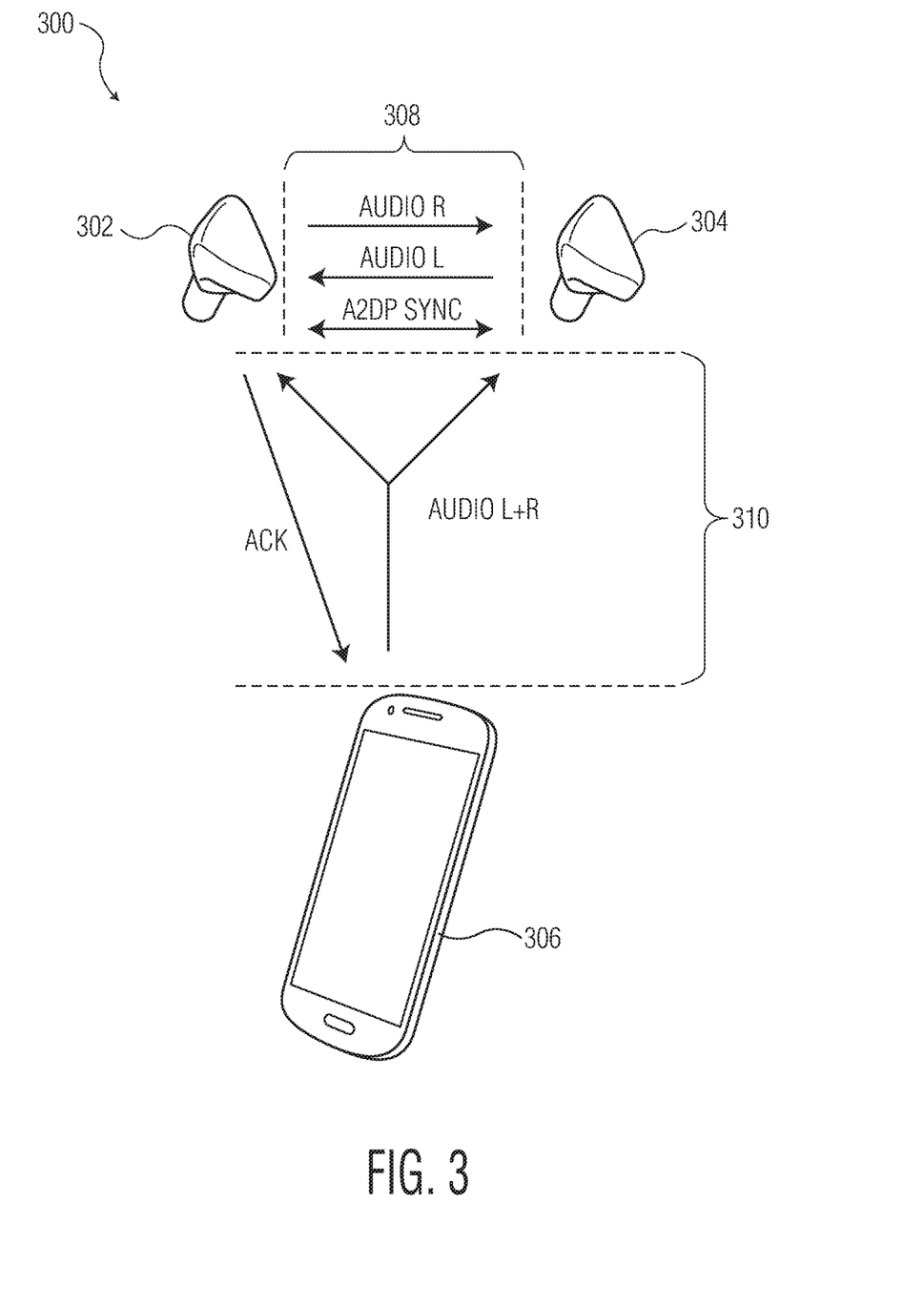
FIG. 3 pictorially depicts a third example protocol for wireless communication between wireless devices used for media playback communication with reliable wireless links.

In example embodiments presented herein, wireless devices, such as earbuds, are more symmetrically designed to enable more robustness in the system. For example, in case a Bluetooth Classic link from another wireless device, such as a smartphone or third wireless device 306, to the left earbud is interrupted, perhaps due to body shadowing, there is a high probability that the right earbud, having certain circuits that are symmetrical to the left earbud, can still set up a reliable link to the smartphone or third wireless device 306.

FIG. 3 pictorially depicts a third example protocol 300 for wireless communication between wireless devices used for media playback communication with reliable wireless links. The third example protocol 300 includes: a first wireless device 302 (e.g. a snooping/sniffing left or earbud), a second wireless device 304 (e.g. potentially blocked right earbud), a third wireless device 306 (e.g. smartphone), a first wireless link 308 (e.g. NFMI, NFEMI), and a second wireless link 310 (e.g. Bluetooth Classic). In this example 300 all of the second wireless links 310 are reliable as shown by a solid line.

The wireless devices 302, 304, 306 can include: a microphone; a earbud; a hearable; a smartphone; a smartwatch; a wearable device; a tablet; or a computer.

The first wireless device 302 (e.g. snooping L earbud in this example) configured to communicate with the second wireless device 304 (e.g. potentially body shadowed R earbud in this example) over the first wireless link 308 (e.g. NFMI), according to a first wireless link protocol. The first wireless link protocol defines communications between the first wireless device 302 and the second wireless device 304 (e.g. which wireless devices are permitted to communicate over the link).

The first wireless device 302 is configured to monitor (e.g. snoop/sniff) communications on the second wireless link 310 between the second wireless device 304 and a third wireless device 306 (e.g. smartphone in this example). The second wireless link 310 is configured according to a second wireless link protocol that defines communications between the second wireless device 304 and the third wireless device 306. The first wireless device 302 is also configured to spoof the second wireless device 304 in response to an error condition or signal degradation on the second wireless link 310.

Thus in some examples, the first and second wireless link protocols limit communications to only between certain wireless devices 302, 304, 306. The wireless link protocols can be based on either: an NFMI protocol, an NFEMI protocol, a Wifi protocol, a Classic Bluetooth protocol, or a BLE protocol.

The error condition can be: an error caused by body shadowing; a missed data packet; a degraded data packet; digital or analog wireless communication errors; a corrupted data packet error; an incomplete data packet error; or an erratic data packet error. The signal degradation can be defined as a signal strength below a threshold value.

First wireless device 302 spoofing of the second wireless device 304 is herein defined to at least include the first wireless device 302 receiving, transmitting and processing wireless communication data packets in a manner such that the third wireless device 306 would either not be able to detect or would not be programmed to respond to communications sent to the third wireless device 306 (e.g. smartphone) by the first wireless device 302 on behalf of the second wireless device 304.

In various example embodiments, the first wireless link 308 (e.g. NFMI, NFEMI) is used for at least two functions.

First, in one example embodiment, for exchange and synchronization of Bluetooth Classic connection parameter data packets. This allows both the first and second wireless devices 302, 304 to act as a single Bluetooth device towards the third wireless device 306 (e.g. smartphone). For example, this synchronized behavior allows both the first and second wireless devices 302, 304 to simultaneously receive (e.g. packet snoop/sniff) the A2DP stereo audio or HEP phone call stream sent, according to the second wireless protocol, to only the second wireless device 304 (i.e. the smartphone/third wireless device 306 only sees one earbud).

Additionally, acknowledgement to the third wireless device 306 after a successful reception of an A2DP or HEP packet can also be sent dynamically from either the first and second wireless devices 302, 304, based on a negotiation between the first and second wireless devices 302, 304 over the first wireless link 308. This negotiation between the first and second wireless devices 302, 304 can for instance be such that an acknowledgement (ACK) signal is sent from the wireless device 302 or 304 with a strongest signal strength link towards the third wireless device 306 to maximize a probability of the ACK arriving at the third wireless device 306.

Second, in another example embodiment, for exchange of communication content data packets (e.g. audio, microphone, etc.) between both the first and second wireless devices 302, 304. Such packet exchange/forwarding can be either unconditional or conditional.

In an unconditional configuration, each of the wireless devices 302, 304 always forwards the other wireless device's 302, 304 audio or other data signals it has extracted from a successfully received A2DP or HEP packet to the other hearable.

In a conditional configuration, each the first and second wireless devices 302, 304 only forwards the other wireless device's 302, 304 data signals it has extracted from a successfully received A2DP or HEP packet to the other wireless device 302, 304, if requested by the other wireless device 302, 304 which has missed this A2DP or HEP packet.

In various example embodiments, the first wireless device 302 (e.g. snooping L earbud) communicates with the third wireless device 306 (e.g. smartphone) using the second wireless link 310 protocol.

The third wireless device 306 in some examples is configured not to respond to the error condition or signal degradation on the second wireless link 310. In other examples, the third wireless device 306 is configured not to detect the error condition or signal degradation on the second wireless link 310. Thus spoofing by the first wireless device 302 will not interrupt communications with the third wireless device 306.

In some example embodiments, the second wireless device 304 is configured to stop communicating with the third wireless device 306 using the second wireless link 310 protocol in response to the first wireless device 302 communicating with the third wireless device 306 using the second wireless link 310 protocol.

In other example embodiments, the first wireless device 302 is configured to send a message over the first wireless link 308 (e.g. NFMI) to the second wireless device 304 in response to the error condition or signal degradation. The message can indicate that the first wireless device 302 is communicating with the third wireless device 306 using the second wireless link 310 protocol.

In various example embodiments, the first wireless device 302 transmits an acknowledgement or a microphone signal to the third wireless device 306 over the second wireless link 310 in response to the error condition or signal degradation.

The first wireless device 302 can be configured to negotiate with the second wireless devices 304 to determine which of the first and second wireless devices 302, 304 transmits an acknowledgement or a microphone signal to the third wireless device 306 over the second wireless link 310 in response to the error condition or signal degradation.

In one example embodiments, the first wireless device 302 is configured to send the acknowledgement or microphone signal if the first wireless device 302 receives a stronger signal strength from the third wireless device 306 than a signal strength received by the second wireless device 304 from the third wireless device 306.

The wireless devices are configured to transmit and receive data packets over the first and second wireless links 308, 310. Examples of data packets include: media data; video playback data; phone call data; mono audio; microphone data; stereo audio playback data; sensor data; health status data; battery status; or device settings.

FIG. 3 shows the generic flow of packets and data using the unconditional forwarding of the audio and when all wireless links 308, 310 are reliable. In this figure, it is assumed that the first wireless device 302 has the best Bluetooth link towards the third wireless device 306 and therefore sends back the ACK to the third wireless device 306. Thereby the chance of the ACK arriving at the third wireless device 306 is maximized. This approach minimizes the number of unnecessary retransmissions from the third wireless device 306 and hence reduces the third wireless device's 306 power consumption and minimizes BW usage of the 2.4 GHz spectrum.

In these various example embodiments, the third wireless device 306 (e.g. smartphone) does not know that the second wireless device 304 (i.e. L earbud) is snooping/sniffing it's signal with the first wireless device 302 (i.e. R earbud)! Thus in one example embodiment during a signal degradation or error condition the third wireless device 306 does not detect the error condition, and no new wireless connection is set up in response to a signal degradation or error condition on the second wireless link 310.

The wireless devices 302, 304, 306 need not be the same in all example embodiments. In one example embodiment, the wireless devices 302, 304 can be two earbuds configured to be worn by a person. In another example embodiment, the wireless devices 302, 304 can be a smartwatch and a smartphone configured to be carried or worn by a person. In yet another example embodiment, the wireless devices 302, 304, 306 are two or more devices positioned at locations such that the first wireless link 308 is still reliably operable.

In some example embodiments, both wireless devices 302, 304 (e.g. earbuds) are substantially symmetric so that each can perform most, or perhaps all, of the first and second wireless link 308, 310 wireless communications functions of the other.

Figure 4:
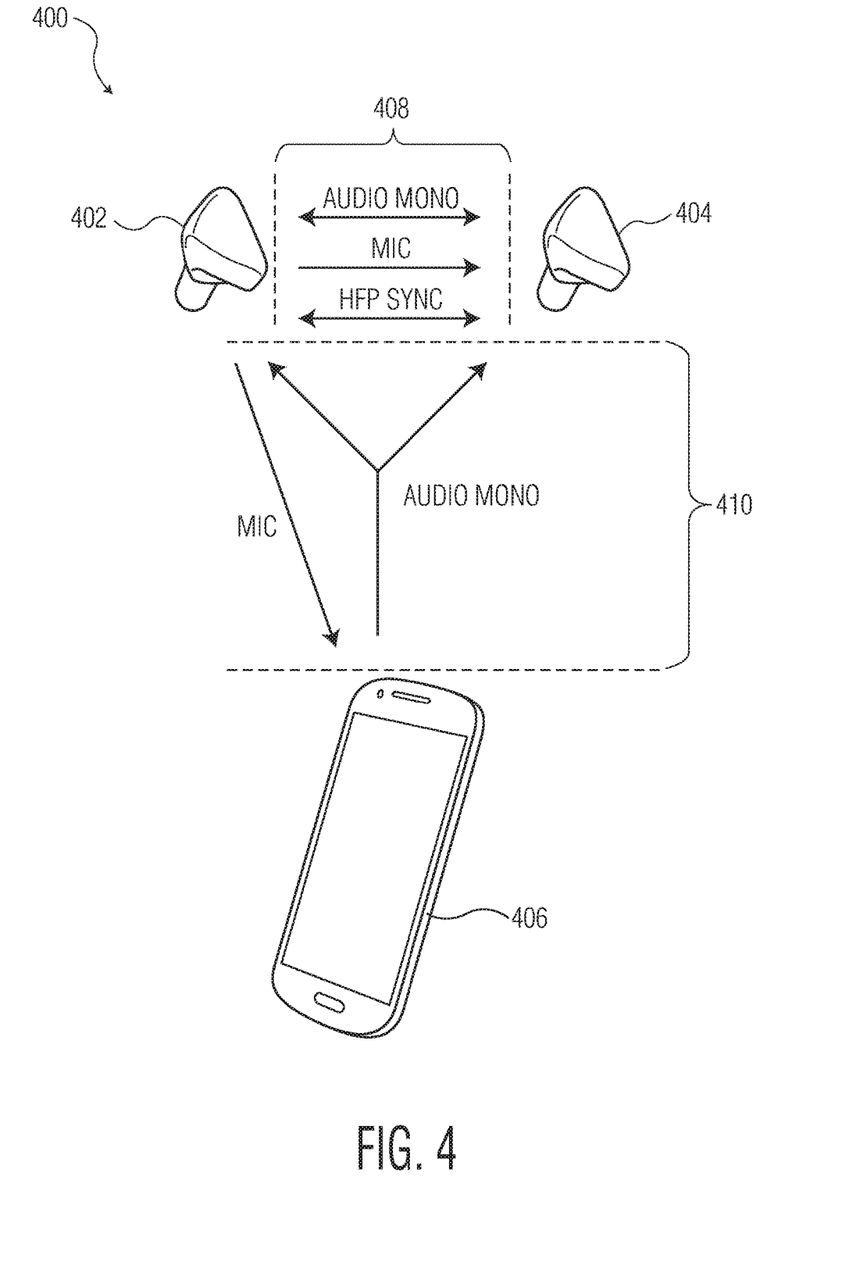
FIG. 4 pictorially depicts a fourth example protocol for wireless communication between wireless devices used for phone call communication with reliable wireless links.

FIG. 4 pictorially depicts a fourth example protocol 400 for wireless communication between wireless devices used for phone call communication with reliable wireless links. The fourth example protocol 400 includes: a first wireless device 402 (e.g. snooping/sniffing left earbud), a second wireless device 404 (e.g. potentially blocked right earbud), a third wireless device 406 (e.g. smartphone), a first wireless link 408 (e.g. NFMI, NFEMI), and a second wireless link 410 (e.g. Bluetooth Classic). In this example 400 all of the second wireless links 410 are reliable as shown by a solid line.

In phone call use cases, both earbuds can receive a same mono HFP audio stream from the third wireless device 406 (e.g. smartphone) by exchanging HFP connection parameters through the NFMI wireless link, and only one side needs to stream its microphone signal back to the third wireless device 406. Similar approaches are used for both playback use cases (FIG. 3) and phone call use cases (FIG. 4).

FIG. 4 shows the generic flow of data packets using the unconditional forwarding of the audio and microphone data when all wireless links are reliable. Here it is assumed that the first wireless device 402 (e.g. snooping left earbud) has the best Bluetooth signal strength/SNR link towards the third wireless device 406 and therefore the first wireless device 402 sends back the ACK to the third wireless device 406 which can be optionally combined with the microphone (Mic) signal. Thereby the chance of the ACK and the Mic data arriving at the third wireless device 306 is maximized. This approach minimizes the number of unnecessary retransmissions from the third wireless device 406 and hence reduces the third wireless device's 306 power consumption and minimizes bandwidth usage of the Bluetooth 2.4 GHz spectrum.

Figure 5A:
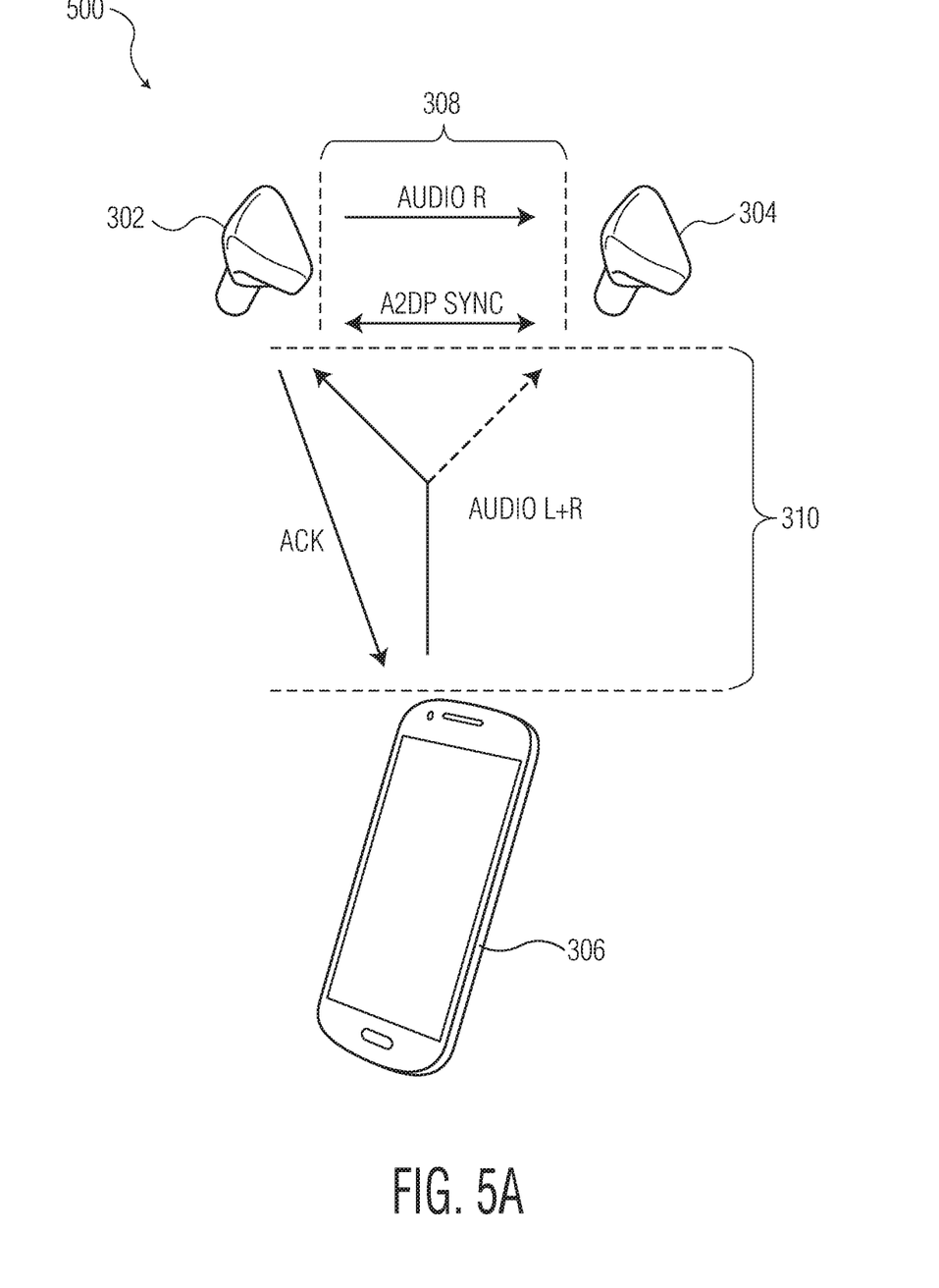
FIGS. 5A, 5B and 5C pictorially depicts a fifth example protocol for wireless communication between wireless devices used for media playback communication with unreliable wireless links.
Figure 5B:
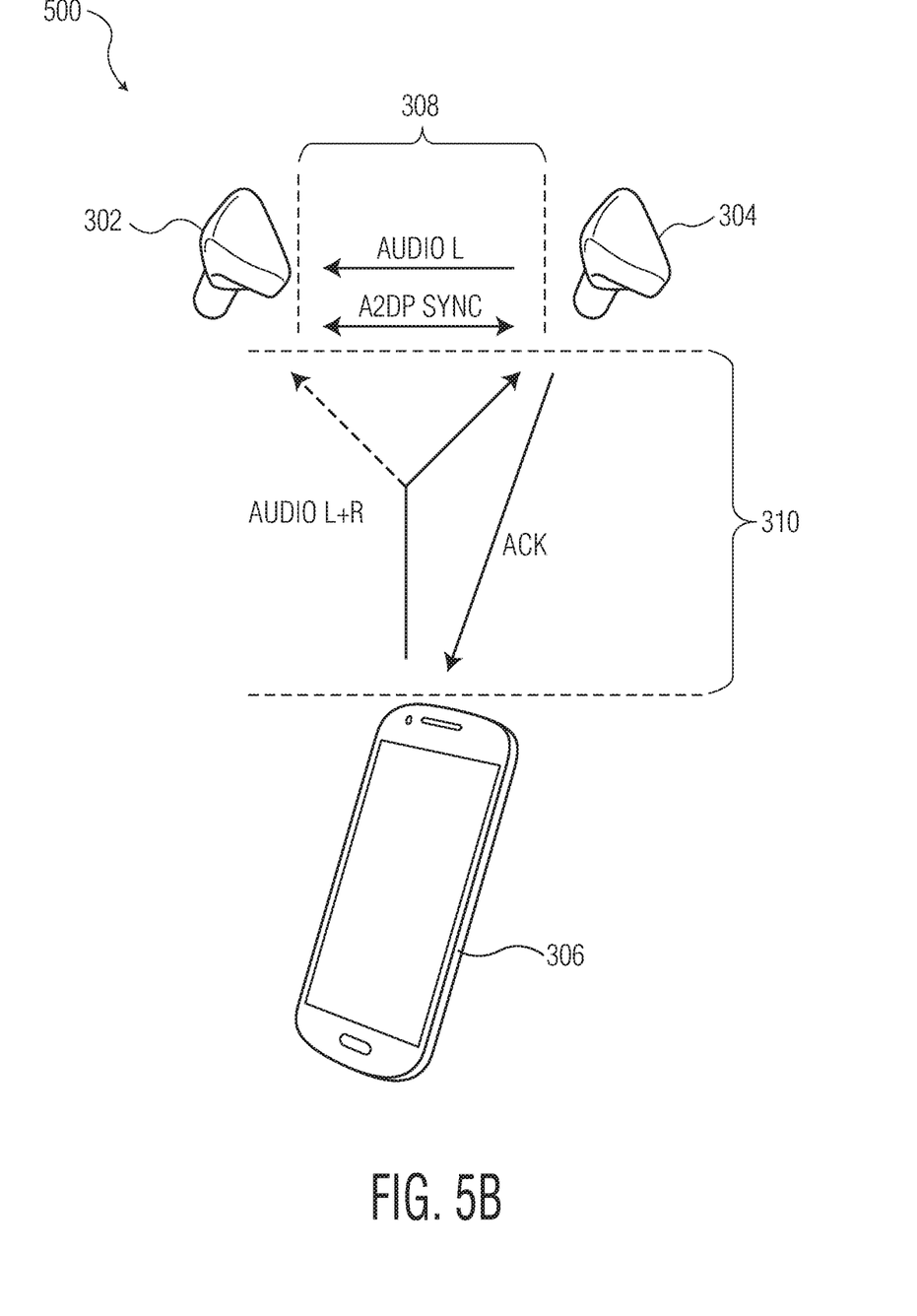
Figure 5C:
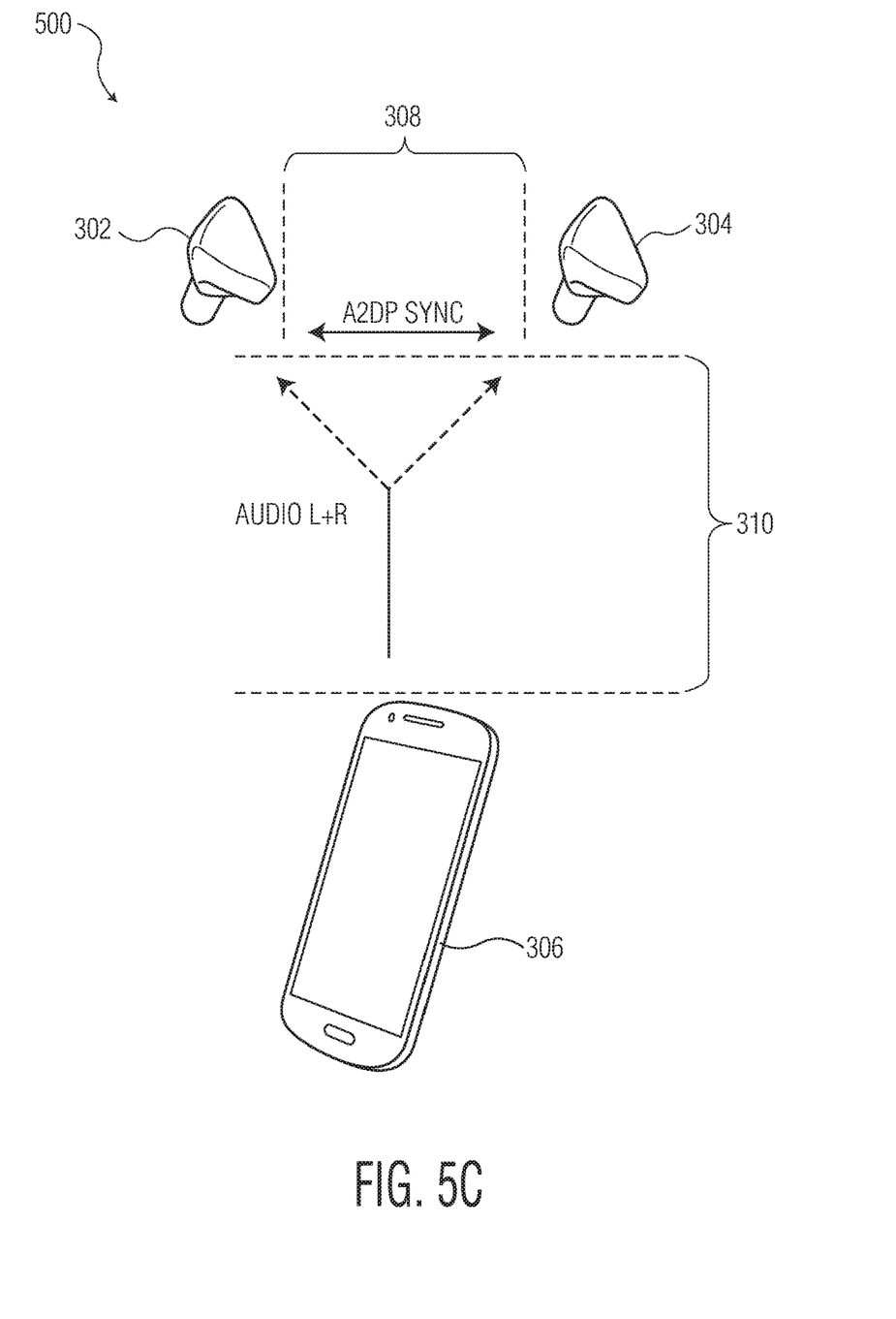

FIGS. 5A, 5B and 5C pictorially depicts a fifth example protocol 500 for wireless communication between wireless devices used for media playback communication with unreliable wireless links. The fifth example protocol 500 includes: the first wireless device 302, the second wireless device 304, the third wireless device 306 (e.g. smartphone), the first wireless link 308 (e.g. NFMI, NFEMI), and the second wireless link 310 (e.g. Bluetooth Classic). In this example 500 some of the second wireless links 310 are reliable as shown by a solid line and some are unreliable as shown by a dashed line.

FIGS. 5A, 5B and 5C shows a flow of packets and data using the unconditional forwarding of the audio in various scenarios where the wireless Bluetooth links are unreliable.

In FIG. 5A, the A2DP packet does not arrive (i.e. dashed line) at the second wireless device 304. However, since the first wireless device 302 has received (i.e. solid line) the A2DP packet, the second wireless device 304 can still obtain its audio via NFMI. Since the A2DP packet was received successfully by the first wireless device 302, the first wireless device 302 will also transmit the ACK back to the third wireless device 306. Upon successful reception of the ACK, the third wireless device 306 can as a result move to a next A2DP audio packet rather than retrying the current packet, which adds delay.

In FIG. 5B, the symmetric case is shown where the first wireless device 302 does not receive (i.e. dashed line) the A2DP packet.

In FIG. 5C, neither the first or second wireless device 302, 304 receives the A2DP packet (i.e. both dashed lines), so neither the first or second wireless device 302, 304 transmits back an ACK packet. This will trigger the third wireless device 306 to retransmit the same A2DP packet.

Figure 6A:
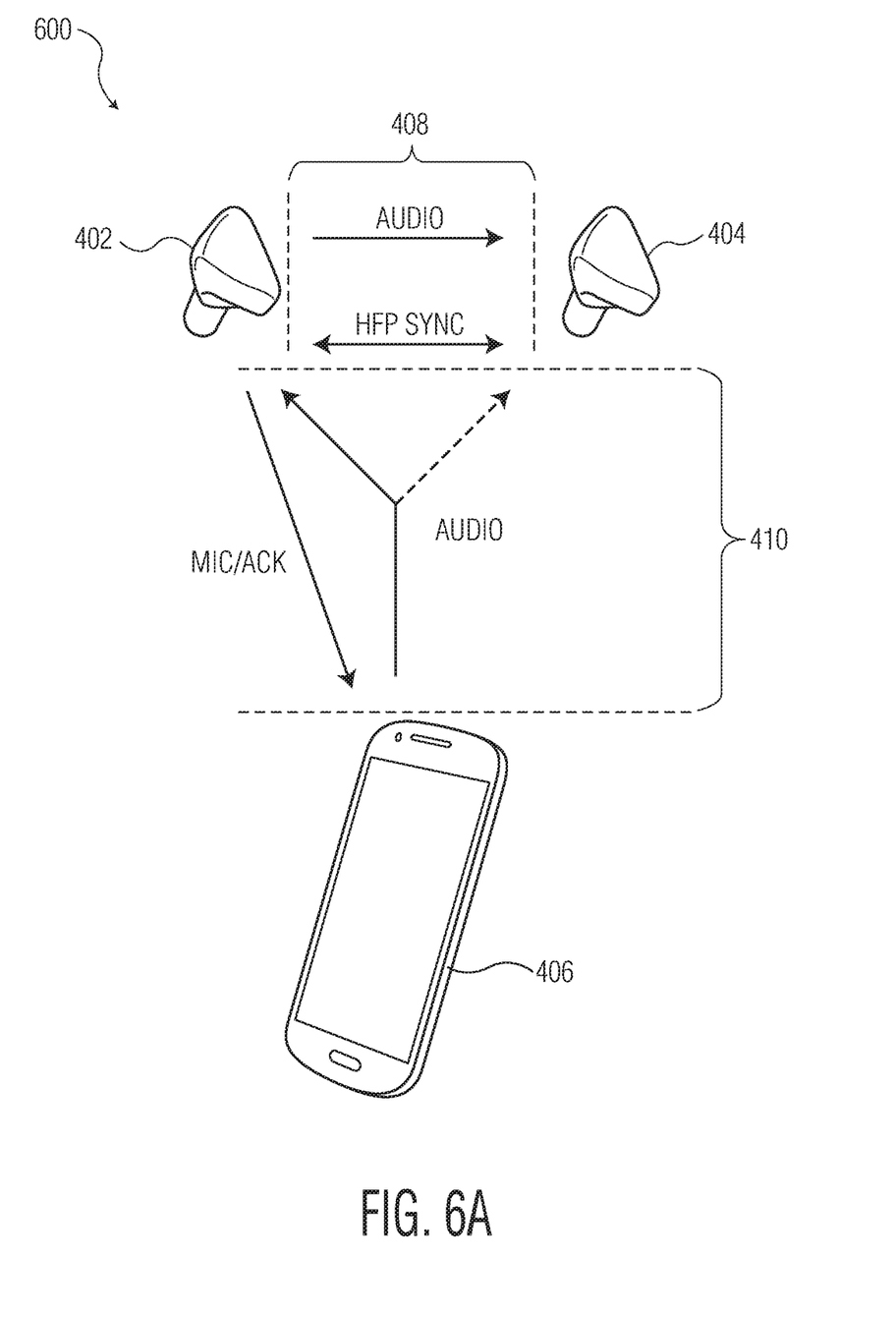
FIGS. 6A, 6B and 6C pictorially depicts a sixth example protocol for wireless communication between wireless devices used for phone call communication with unreliable wireless links.
Figure 6B:
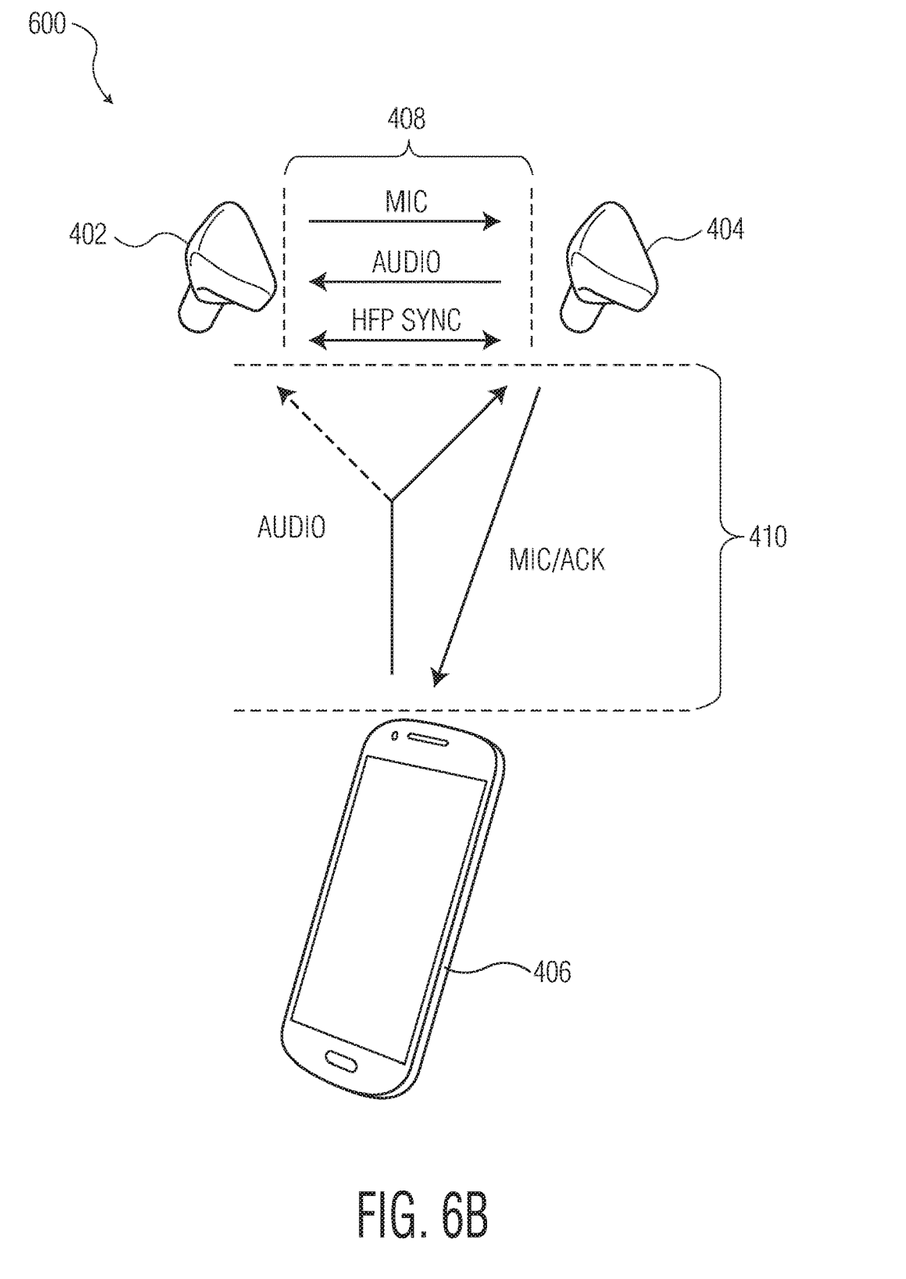
Figure 6C:
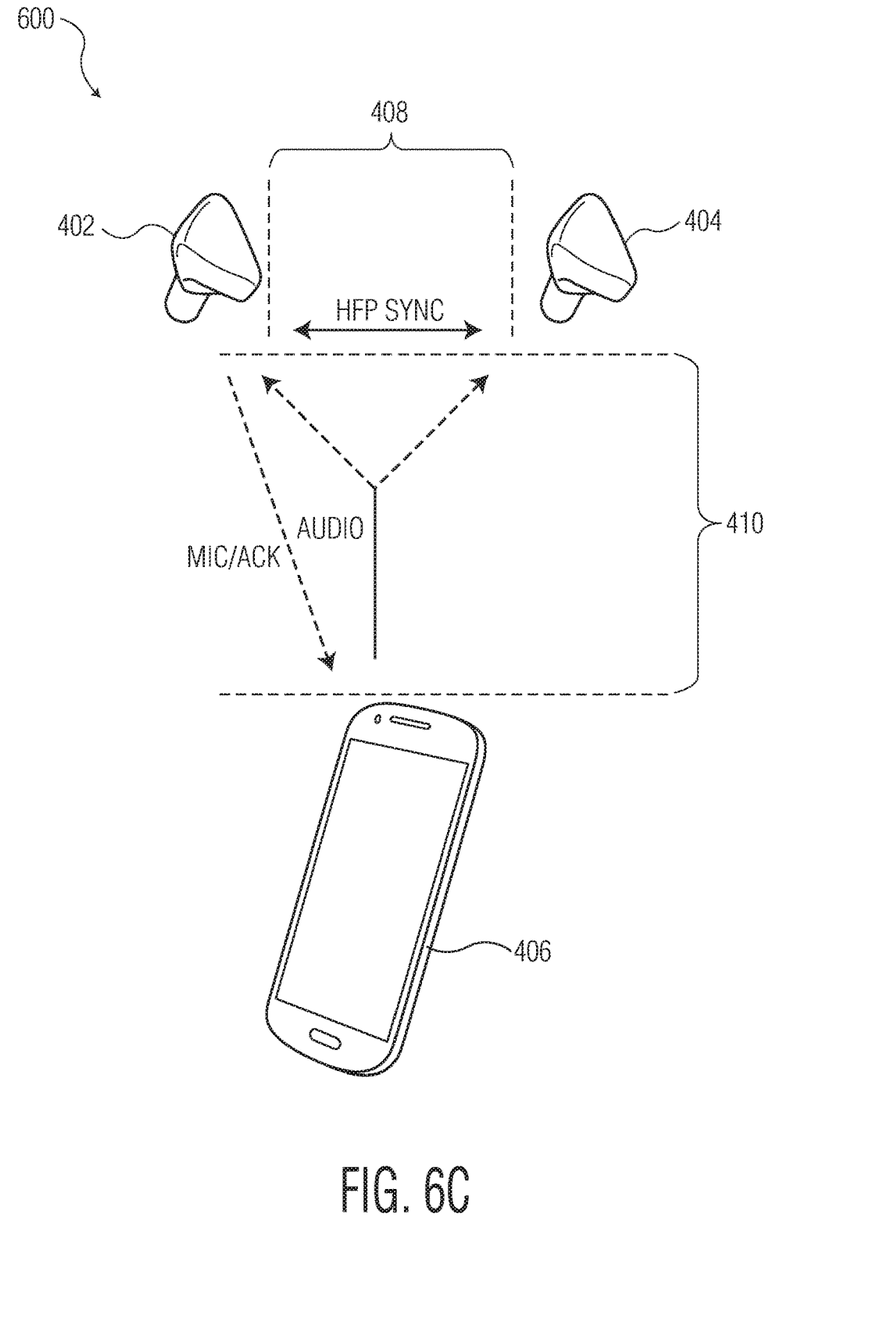

FIGS. 6A, 6B and 6C pictorially depicts a sixth example protocol 600 for wireless communication between wireless devices used for phone call communication with unreliable wireless links. The sixth example protocol 600 includes: the first wireless device 402, the second wireless device 404 the third wireless device 406 (e.g. smartphone), the first wireless link 408, and the second wireless link 410 (e.g. Bluetooth Classic). In this example 600 some of the second wireless links 410 are reliable as shown by a solid line and some are unreliable as shown by a dashed line.

In this example protocol 600, only the first wireless device 402 hosts a microphone and thus generates a microphone signal. This microphone signal needs to be forwarded to the second wireless device 404 using the first wireless link 408 (e.g. NFMI/NFEMI) to provide robustness.

In alternate embodiment, the second wireless device 404 could also host a second microphone and either the first or second wireless device 402, 404 could be used (even intermittently), dependent on which wireless device 402, 404 has a strongest link to the third wireless device 406 (e.g. smartphone).

FIGS. 6A, 6B and 6C shows the generic flow of data packets using the unconditional forwarding of the audio in various scenarios where the second wireless link 410 (e.g. Bluetooth links) are unreliable.

In FIG. 6A, the second wireless link 410 HFP audio packet does not arrive at the second wireless device 404. However, since the first wireless device 402 has snooped on the second wireless link 410 and received the HFP audio packet, the second wireless device 404 can still obtain/ request the audio via the first wireless link 408 (e.g. NFMI, NFEMI). Since the HFP audio packet was received successfully by the first wireless device 402. The first wireless device 402 also transmits the ACK back to the third wireless device 406 together with the Mic packet.

In FIG. 6B, the symmetric case is shown where the first wireless device 402 does not receive the HFP packet. Since it is assumed here that the microphone of the first wireless device 402 is always used, the Mic packet is first forwarded to the second wireless device 404 using the first wireless link 408 (e.g. NFMI, NFEMI). The second wireless device 404 then sends the Mic (combined with the ACK) to the third wireless device 306.

An alternative approach would be to switch to the microphone of the second wireless device 404, which avoids the need to forward the Mic signal over the first wireless link 408. Another approach would be to combine both left and right microphone signals (using e.g. beamforming or other mixing techniques) to improve the SNR. This requires both the first and second wireless device 402, 404 to exchange their microphone signals using the first wireless link 408 (e.g. NFMI, NFEMI). The combined signal can be sent by either wireless device 402, 404 if they both compute the combined signal.

In FIG. 6C, neither wireless device 402, 404 receives the HFP packet. Neither wireless device 402, 404 transmits back an ACK packet but one of the wireless devices 402, 404 may still send out a Mic packet to the third wireless device 306 in order to maximize the chance of the Mic signal eventually arriving at the third wireless device 306.

Some benefits from the example embodiment presented include:

Robustness of audio transfer even under when suffering from severe body shadowing effects for various use cases at minimal extra latency, resulting in fewer audio drop-outs.

Minimizing air time and overall wireless device power consumption as the ACK is send back to the third wireless device 306 over the strongest Bluetooth link. This minimizes the number of retransmissions.

Transparent integration with existing smartphones/third wireless device 306s (e.g. do not require any modifications to the smartphone/third wireless device 306).

NFMI adds more bandwidth to these example embodiments since Bluetooth and NFMI operate in different frequency bands.

Using NFMI for ear-to-ear communication rather than RF implies that the RF antenna can be optimized for earbud-to-phone connection. Thus some example embodiments need not take the ear-to-ear wireless link into account while designing the RF antenna.

Thus as discussed above, the near-field magnetic induction (NFMI) channel enables multiple wireless devices (e.g. both earbuds) to communicate reliably with each other, thereby substantially improving an overall communications robustness. NFMI enables data (e.g. audio) transfer even when there is various degrees of body shadowing. The low latency and ultra-low power aspects of NFMI further enhance a user's experience.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An apparatus for wireless communication, comprising:
a first wireless device configured to communicate with a second wireless device over a first wireless link, according to a first wireless link protocol,
wherein the first wireless link protocol defines communications between the first wireless device and the second wireless device,
the first wireless device is configured to monitor communications on a second wireless link between the second wireless device and a third wireless device,
the second wireless link is configured according to a second wireless link protocol that defines communications between the second wireless device and the third wireless device, and
the first wireless device is configured to communicate with the third wireless device over a third wireless link using the second wireless link protocol in response to an error condition or signal degradation on the second wireless link between the second wireless device and a third wireless device, and
both the first and second wireless devices act as a single device toward the third wireless device by using the second wireless link protocol in all communications with the third wireless device;
wherein the first wireless device is configured to negotiate with the second wireless devices to determine which of the first and second wireless devices transmits an acknowledgement or a microphone signal to the third wireless device over the second wireless link in response to the error condition or the signal degradation; and
wherein the first wireless device is configured to send the acknowledgement or the microphone signal after the first wireless device receives a stronger signal strength from the third wireless device than a signal strength received by the second wireless device from the third wireless device.

2. The apparatus of claim 1, wherein the third wireless device is configured not to respond to the error condition or the signal degradation on the second wireless link.

3. The apparatus of claim 1, wherein the third wireless device is configured not to detect the error condition or the signal degradation on the second wireless link.

4. The apparatus of claim 1, wherein the second wireless link protocol is configured to limit communications to only between the second wireless device and the third wireless device.

5. The apparatus of claim 1, wherein the second wireless device is configured to stop communicating with the third wireless device using the second wireless link protocol in response to the first wireless device communicating with the third wireless device using the second wireless link protocol.

6. The apparatus of claim 1, wherein the first wireless device is configured to send a message over the first wireless link to the second wireless device in response to the error condition or the signal degradation.

7. The apparatus of claim 6, wherein the message indicates that the first wireless device is communicating with the third wireless device using the second wireless link protocol.

8. The apparatus of claim 1, wherein the wireless link protocols are based on at least one of an NFMI protocol, an NFEMI protocol, a Wifi protocol, a Classic Bluetooth protocol, or a BLE protocol.

9. The apparatus of claim 1, wherein the first wireless device is configured to transmit an acknowledgement or a microphone signal to the third wireless device over the second wireless link in response to the error condition or the signal degradation.

10. The apparatus of claim 1, wherein the first wireless device is configured to always forward data packets received from the third wireless device to the second wireless device.

11. The apparatus of claim 1, wherein the first wireless device is configured not to forward data packets received from the third wireless device to the second wireless device unless requested to do so by the second wireless device.

12. The apparatus of claim 1, wherein the error condition is at least one of an error caused by body shadowing, a missed data packet, a degraded data packet; digital or analog wireless communication errors, a corrupted data packet error, an incomplete data packet error, or an erratic data packet error.

13. The apparatus of claim 1, wherein the signal degradation is defined as at least one of a signal strength below a threshold value, a signal-to-noise ratio below the threshold value, or a wanted-to-interferer ratio below the threshold value.

14. The apparatus of claim 1, wherein the first wireless device is configured to receive data packets over the second wireless link, and the data packets include at least one of media data, video playback data, phone call data; mono audio, microphone data, stereo audio playback data, sensor data, health status data, a battery status, or device settings.

15. The apparatus of claim 1, wherein the wireless devices include at least one of a microphone, an earbud, a hearable, a smartphone, a smartwatch, a wearable device, a tablet, or a computer.

16. The apparatus of claim 1, wherein the first wireless device is a first earbud, the second wireless device is a second earbud, and the third wireless device is a smartphone.

17. The apparatus of claim 1, wherein the first wireless link is an NFMI or NFEMI link, and the second wireless link is a Bluetooth Classic link.

* * * * *